US008889793B2

(12) United States Patent
Bergstra et al.

(10) Patent No.: US 8,889,793 B2
(45) Date of Patent: Nov. 18, 2014

(54) MULTIMODAL POLYETHYLENE COPOLYMER RESIN COMPOSITION, A PREPARATION PROCESS THEREFOR AND A POLYMERIC PRODUCT COMPRISING THE SAME

(75) Inventors: Michiel Friso Bergstra, Helsinki (FI); Erik Johan Gunnar Eriksson, Helsinki (FI)

(73) Assignee: Borealis Technology OY, Porvoo (FI)

( * ) Notice: Subject to any disclaimer, the term of this patent is extended or adjusted under 35 U.S.C. 154(b) by 734 days.

(21) Appl. No.: 12/667,308

(22) PCT Filed: Jul. 3, 2008

(86) PCT No.: PCT/EP2008/005461
§ 371 (c)(1),
(2), (4) Date: Mar. 3, 2010

(87) PCT Pub. No.: WO2009/003712
PCT Pub. Date: Jan. 8, 2009

(65) Prior Publication Data
US 2010/0210791 A1 Aug. 19, 2010

(30) Foreign Application Priority Data

Jul. 4, 2007 (EP) ..................................... 07075558

(51) Int. Cl.
*C08L 23/04* (2006.01)
*C08L 23/08* (2006.01)
*C08F 210/16* (2006.01)
*C08F 4/655* (2006.01)

(52) U.S. Cl.
CPC ............. *C08L 23/04* (2013.01); *C08L 2314/02* (2013.01); *C08L 2205/02* (2013.01); *C08L 2314/06* (2013.01); *C08L 23/0815* (2013.01); *C08L 2205/03* (2013.01); *C08F 210/16* (2013.01); *C08F 4/6555* (2013.01)
USPC .......................................... 525/240; 525/191

(58) Field of Classification Search
CPC ......... C08L 23/00; C08L 23/04; C08L 23/08; C08L 23/0807; C08L 23/0815; C08L 2205/025; C08L 2205/03; C08F 210/16
USPC .................................................. 525/191, 240
See application file for complete search history.

(56) References Cited

U.S. PATENT DOCUMENTS 4,536,550 A 8/1985 Moriguchi et al.

FOREIGN PATENT DOCUMENTS

| EP | 0517868 | | 7/1992 |
|---|---|---|---|
| EP | 0810235 | A2 | 3/1997 |
| EP | 0797599 | A1 | 10/1997 |
| EP | 0897934 | A1 * | 2/1999 |
| EP | 1655334 | A1 | 10/2006 |
| EP | 1780225 | A1 | 2/2007 |
| EP | 1739110 | A1 | 3/2007 |
| WO | 9212182 | A1 | 7/1992 |
| WO | 9618662 | A1 | 6/1996 |
| WO | 03106510 | A1 | 12/2003 |
| WO | 2004055068 | A1 | 7/2004 |
| WO | 2004055069 | A1 | 7/2004 |
| WO | 2004111095 | A1 | 12/2004 |
| WO | 2007022908 | A2 | 3/2007 |
| WO | 2007045415 | A1 | 4/2007 |
| WO | 2008077530 | A2 | 7/2008 |

OTHER PUBLICATIONS

Opposition documents in European application EP08773863.9 Available online at https://register.epo.org/application?number=EP08773863&Ing=en&tab=doclist on Sep. 24, 2013.*
McAuley, K. B. et al., "On-Line Inference of Polymer Properties in an Industrial Polyethylene Reactor", AIChE Journal, Jun. 1991, vol. 37, No. 6, pp. 825-835.

* cited by examiner

*Primary Examiner* — Irina S Zemel
*Assistant Examiner* — Jeffrey Lenihan
(74) *Attorney, Agent, or Firm* — The Webb Law Firm

(57) ABSTRACT

The invention relates to a multimodal polyethylene copolymer resin composition comprising (a) a lower molecular weight (LMW) ethylene polymer fraction and (b) a higher molecular weight (HMW) ethylene copolymer fraction, wherein the higher molecular weight (HMW) ethylene copolymer fraction comprises (b1) a higher molecular weight (HMW) ethylene copolymer subfraction having a weight average molecular weight at least 2 times the weight average molecular weight (Mw) of said multimodal polyethylene copolymer resin composition, which (b1) higher molecular weight (HMW) ethylene copolymer subfraction amounts from about 1-30 wt % of the total amount of the multimodal polyethylene copolymer resin composition and comprises comonomers in amount of at least about 1 wt % of the total amount of comonomer present in said multimodal polyethylene copolymer resin composition, a process for its preparation and its use.

15 Claims, 1 Drawing Sheet

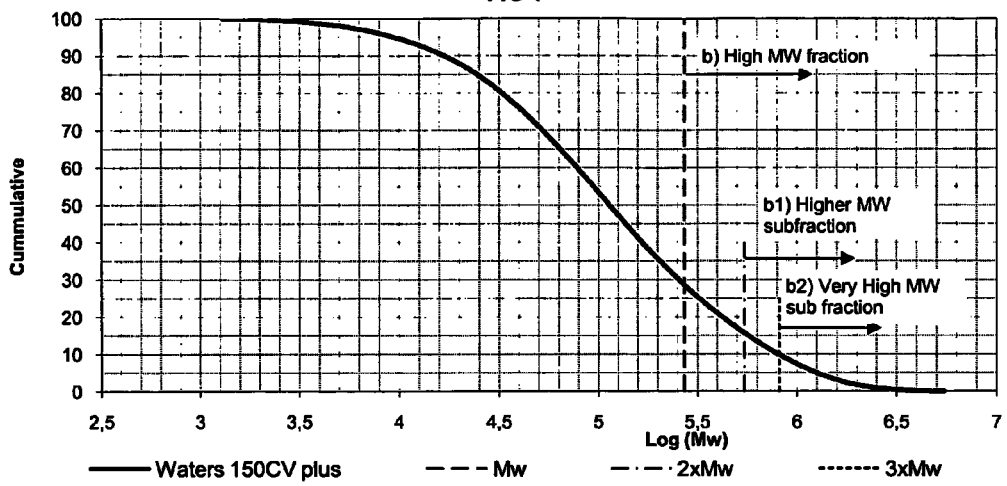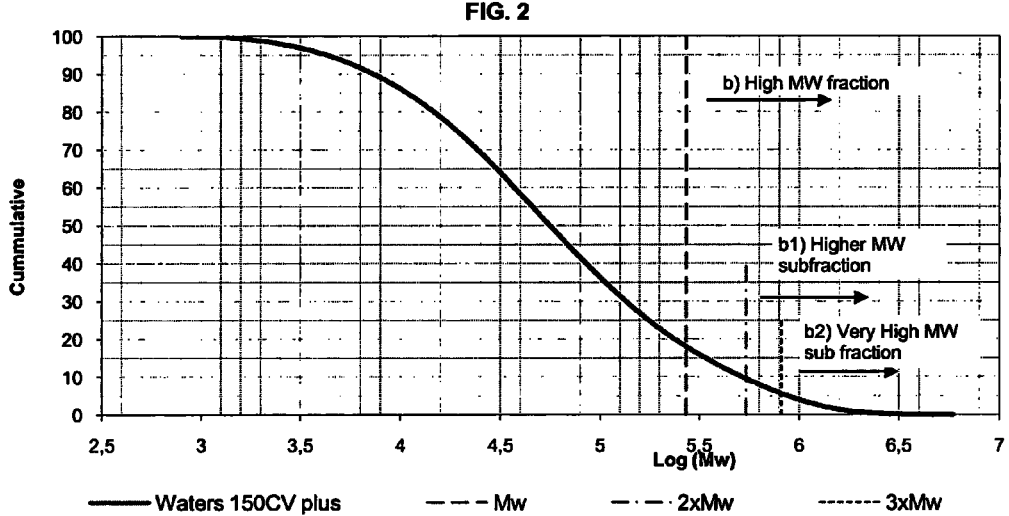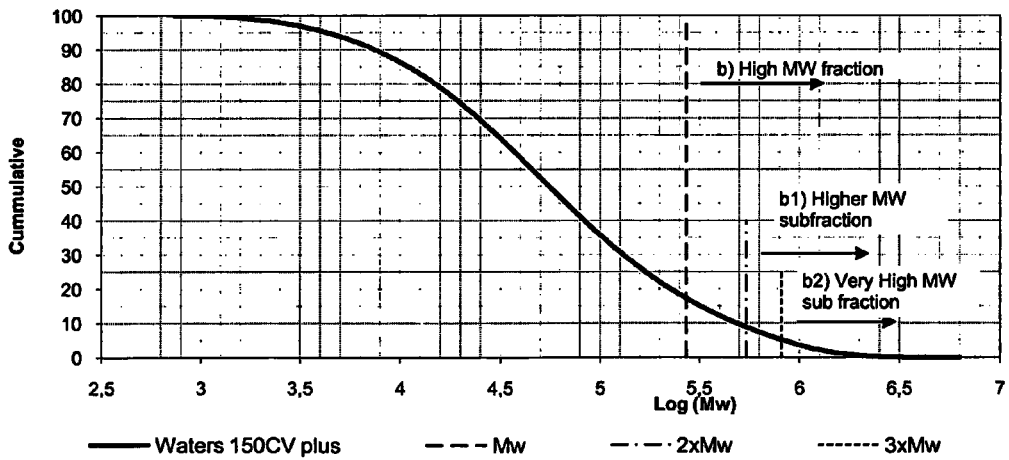

//MULTIMODAL POLYETHYLENE COPOLYMER RESIN COMPOSITION, A PREPARATION PROCESS THEREFOR AND A POLYMERIC PRODUCT COMPRISING THE SAME

BACKGROUND OF THE INVENTION

1. Field of the Invention

The present invention relates to a multimodal polyethylene copolymer resin composition comprising a lower molecular weight ethylene polymer (LMW) fraction and a higher molecular weight ethylene polymer (HMW) fraction, and to a process for preparing the above mentioned multimodal polyethylene copolymer resin composition, and to a polymeric product comprising and/or made from the above mentioned multimodal polyethylene copolymer resin composition.

The term "multimodal" means herein, unless otherwise stated, multimodality with respect to molecular weight distribution and includes also bimodal polymer.

2. Description of the Prior Art

Usually, a polyethylene comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

Traditionally, a cascade of reactors is used wherein different reaction conditions are applied during the catalytic polymerization in order to obtain a broad multimodal molecular weight distribution. By using a cascade of reactors it is possible to produce an ethylene polymer resin composition comprising a lower molecular weight (LMW) fraction and a higher molecular weight (HMW) fraction. However, when the higher molecular weight fraction is produced, the comonomer concentration in the higher molecular weight part decreases with increasing molecular weight. This is typical especially for polymers produced using Ziegler Natta catalysts.

Furthermore, the higher molecular weight (HMW) fraction typically has also an influence on the mechanical properties of a final polymer so that e.g. with said high molecular weight (HMW) fraction i.e. environmental stress crack resistance (ESCR) can be controlled.

Multimodal polyethylene compositions produced in a multistage process and comprising at least a low molecular weight (LMW) fraction and a high molecular weight (HMW) fraction may sometimes comprise polymer particles of "very high molecular weight", i.e. gels, defined e.g. as the "white spots" in the prior art literature, which particles can cause inhomogeneities in the composition and the end-products produced thereof.

SUMMARY OF THE INVENTION

A first object of the present invention is to provide a multimodal polyethylene copolymer resin composition for use in various product applications, with improved mechanical properties, such as improved environmental stress cracking properties.

A second object of the present invention is to provide a multimodal polyethylene copolymer resin composition which, depending on the properties that are variable within the product window of the invention, enables further, desirable alternatives for different end applications of the multimodal polyethylene resin composition, with desirable, even improved, polymer properties over the prior art products.

Another object is to provide a process for producing a multimodal polyethylene copolymer resin composition, which process enables to obtain the multimodal product with advantageous properties, such as advantageous mechanical properties and/or good homogeneity between the particles with respect to molecular weight distribution in industrially feasible production rates.

BRIEF DESCRIPTION OF THE DRAWINGS

The foregoing summary, as well as the following detailed description, will be better understood when read in conjunction with the appended drawings.

FIG. 1 is a graph of cumulative weight percent of comonomer as a function of Log (Mw) for the comparative example;

FIG. 2 is a graph of cumulative weight percent of comonomer as a function of Log (Mw) for Example 1, according to the present invention; and FIG. 3 is a graph of cumulative weight percent of comonomer as a function of Log (Mw) for Example 2, according to the present invention.

DETAILED DESCRIPTION OF THE PREFERRED EMBODIMENTS

A first aspect of the present invention relates to multimodal polyethylene copolymer resin composition comprising a lower molecular weight (LMW) ethylene polymer fraction (a) and a higher molecular weight (HMW) ethylene copolymer fraction (b), wherein the higher molecular weight (HMW) ethylene copolymer fraction (b) comprises a higher molecular weight (HMW) ethylene copolymer subfraction (b1) having a weight average molecular weight at least 2 times the weight average molecular weight (Mw) of said multimodal polyethylene copolymers resin composition, which higher molecular weight (HMW) ethylene copolymer subfraction (b1) amounts from about 1-30 wt % of the total amount of the multimodal polyethylene copolymer resin composition and comprises comonomers in amount of at least about 1 wt % of the total amount of comonomer present in said multimodal polyethylene copolymer resin composition.

In a preferred embodiment the multimodal polyethylene copolymer resin composition contains:

a lower molecular weight (LMW) ethylene polymer fraction (a), a higher molecular weight (HMW) ethylene copolymer fraction (b), also referred to herein as a high molecular weight (HMW) fraction.

a higher molecular weight (HMW) ethylene copolymer subfraction (b1) and, a very high molecular weight (VHMW) ethylene copolymer subfraction (b2).

Due to the fact that the high molecular weight ethylene copolymer fraction (b) of the resin composition comprises the subfraction (b1)—which subfraction (b1) has a relatively high molecular weight and a relatively high amount of comonomers—the mechanical properties of the resin composition are improved.

This is particularly noticeable in end products prepared from this resin composition e.g. in terms of an increased resistance to environmental stress cracking (ESCR).

The higher molecular weight (HMW) ethylene copolymer subfraction (b1) typically comprises ethylene copolymers having a weight average molecular weight greater than 500.000, and preferably between 500,000 and 1000,000.

The higher molecular weight (HMW) ethylene copolymer subfraction (b1) comprises preferably about 1-20 wt %, more preferably up to 15 wt % of the total amount of the multimodal polyethylene copolymer resin.

Preferably, the higher molecular weight (HMW) ethylene copolymer subfraction (b1) comprises comonomer up to 30 wt %, more preferably between 3-25 wt %, and even more preferably of between 5 and 20 wt % of the total amount of comonomer.

The multimodal polyethylene copolymer resin composition according to the present invention comprising HMW ethylene copolymer subfraction b1 within these ranges provides highly desirable properties.

In a preferred embodiment the higher molecular weight (HMW) ethylene copolymer fraction (b) comprises a very high molecular weight (VHMW) ethylene copolymer subfraction (b2), which very high molecular weight (VHMW) subfraction (b2) comprises ethylene copolymers having a weight average molecular weight at least 3 times the weight average molecular weight (Mw) of said multimodal polyethylene copolymer resin composition, and which very high molecular weight (VHMW) ethylene copolymer subfraction (b2) amounts from about 0.5-15 wt % of said multimodal polyethylene copolymer resin composition.

The very high molecular weight (VHMW) subfraction (b2) typically comprises ethylene copolymers having a weight average molecular weight greater than 1.000.000.

The very high molecular weight (VHMW) subfraction (b2) has a comonomer content of about 3-20 wt %, preferably about 5-20 wt % of the total amount of comonomer present in said multimodal polyethylene copolymer resin composition.

The multimodal polyethylene copolymer resin composition according to the present invention comprising HMW ethylene copolymer subfraction b2 within these ranges also provides highly desirable properties.

The total amount of comonomer present in the multimodal polyethylene copolymer resin composition is 20 wt % or less, preferably between about 0.1 and 15 wt %, more preferably between about 0.1 and 10 wt %. As comonomer, olefins with 3-20 carbon atoms including (C3-C20) alpha-olefins and preferably (C3-C12) alpha-olefins are used. Particular preferred comonomers are propene, 1-butene, 1-hexene, 1-octene, and mixtures thereof.

Preferably, the lower molecular weight (LMW) ethylene polymer fraction (a) comprises ethylene homo- and/or copolymers.

The comonomer distribution as defined in claim 1 provides the inventive effect of the multimodal polyethylene copolymer resin of the invention, i.e. good mechanical properties and/or homogeneity as mentioned above.

The other properties of the multimodal polyethylene copolymer resin composition of the invention are not critical and can vary considerably within the scope of the claim 1. Thus said other properties, such as density, melt flow rate, molecular weight distribution etc. can be chosen and adapted depending on the desired end application of the multimodal polyethylene copolymer resin of the invention. E.g. the following preferable subgroups of multimodal polyethylene copolymer resin composition are given. The density of the multimodal polyethylene copolymer resin is preferably more than 900 kg/m$_3$, more preferably more than 915 kg/m$^3$.

The multimodal polyethylene copolymer resin composition of the invention has a weight average molecular weight Mw of from 100 000 to 800 000, preferably of from 100 000 to 500 000.

The LMW fraction (a) has a weight average molecular weight Mw of from 10 000 to 125 000, preferably of from 50 000 to 100 000.

The HMW fraction (b) has a weight average molecular weight Mw of from 100 000 to 1 000 000, preferably of from 125 000 to 1 000 000.

The HMW fraction (b) has a higher Mw than the LMW fraction (a).

The upper limit of said density is not limited and can be e.g. up to 960 kg/m$^3$ depending on the end application of the multimodal polyethylene copolymer resin composition.

Preferably, the melt flow rate (MFR$_2$) of the multimodal polyethylene copolymer resin composition may be less than or equal to 100 g/10 min, preferably less than equal to 50 g/10 min.

The lower limit of said MFR$_2$ is not limited and may be e.g. at least 0.001 g/10 min or more, again depending on the end application of the multimodal polyethylene copolymer resin composition.

The multimodal polyethylene copolymer resin composition may comprise further polyethylene homo- or copolymer fractions.

In one preferable embodiment the multimodal polyethylene copolymer resin composition consists of a lower molecular weight (LMW) ethylene homo or copolymer fraction (a) and a high molecular weight (HMW) ethylene copolymer fraction (b), whereby said high molecular weight (HMW) ethylene copolymer fraction (b) comprises a higher molecular weight (HMW) ethylene copolymer subfraction (b1), and/or preferably a very high molecular weight (VHMW) ethylene copolymer subfraction (b2) as defined above or below, or in the claims.

Further preferably, the polydispersity index (Mw/Mn; referred herein as PDI) of the multimodal polyethylene copolymer resin composition is more than 3, preferably more than 5.

The upper limit of said PDI is not limited and may be e.g. up to 50 depending on the end application of the multimodal polyethylene copolymer resin composition.

A second aspect of the present invention relates to a process for the preparation of a multimodal polyethylene copolymer resin composition comprising the steps of:

i) polymerizing ethylene monomers, and optionally one or more comonomers, in the presence of a catalyst to obtain
(a) a lower molecular weight (LMW) ethylene polymer fraction; and ii) polymerizing ethylene monomers and one or more comonomers, in the presence of the polymerization product of the first polymerization step and of a catalyst to obtain a higher molecular weight (HMW) ethylene copolymer fraction (b), wherein the higher molecular weight (HMW) ethylene copolymer fraction (b) comprises a higher molecular weight (HMW) ethylene copolymer subfraction (b1) having a weight average molecular weight at least 2 times the weight average molecular weight (Mw) of said multimodal polyethylene copolymers resin composition, which higher molecular weight (HMW) ethylene copolymer subfraction (b1) amounts from about 1-30 wt % of the total amount of the multimodal polyethylene copolymer resin composition and comprises comonomers in amount of at least about 1 wt % of the total amount of comonomer present in said multimodal polyethylene copolymer resin composition.

By carrying out the process of the invention a multimodal polyethylene copolymer resin composition is obtained having a higher average molecular weight fraction that comprises a relatively high amount of comonomer. Such a relatively high amount of comonomer in the HMW fraction of the resin composition provides products produced thereof with improved mechanical properties.

The higher molecular weight (HMW) ethylene copolymer subfraction (b1) typically comprises ethylene copolymers having a weight average molecular weight greater than 500 000.

Further, the amount of the higher molecular weight (HMW) ethylene copolymer subfraction (b1) is preferably about 1-20 wt % of the total amount of the multimodal polyethylene copolymer resin of the invention.

The higher molecular weight (HMW) ethylene copolymers subfraction (b1) comprises up to 30 wt %, preferably about 3-25 wt % of the total amount of comonomer.

In a preferred embodiment, the higher molecular weight (HMW) ethylene copolymer subfraction (b1) comprises a very high molecular weight (VHMW) ethylene copolymer subfraction (b2), which very high molecular weight (VHMW) subfraction (b2) comprises ethylene copolymers having a weight average molecular weight at least 3 times of the weight average molecular weight (Mw) of said multimodal polyethylene copolymer resin composition, and which very high molecular weight (VHMW) ethylene copolymers subfraction (b2) amounts from about 0.5-15 wt % of the said multimodal polyethylene copolymer resin composition.

The very high molecular weight (VHMW) subfraction (b2) typically comprises ethylene copolymers having a weight average molecular weight greater than 1.000.000.

More preferably, the very high molecular weight (VHMW) ethylene copolymer subfraction (b2) has a comonomer content of about 3-20 wt %, preferably about 5-20 wt % of the total amount of comonomer present in said multimodal polyethylene copolymer resin composition.

The total amount of comonomer present in the multimodal polyethylene copolymer resin composition is 20 wt % or less, preferably between about 0.1 and 15 wt %, more preferably between about 0.1 and 10 wt %.

As comonomer, preferably an alpha-olefin comonomer is used. More preferably (C3-C20) alpha-olefins and even more preferably (C3-C12) alpha-olefins are used. Particular preferred comonomers are 1-butene, 1-hexene, 1-octene, and mixtures thereof.

Preferably, the lower molecular weight (LMW) ethylne polymer fraction (a) comprises ethylene homo or copolymer.

The choice of the catalyst for producing the multimodal polyethylene copolymer resin of the invention is not critical. As polymerization catalyst a Ziegler-Natta catalyst, single site catalyst including metallocene-based catalyst and non-metallocene, which both terms are well known in the art, or chromium based catalyst may be used, preferably a conventional Ziegler Natta catalyst or single site catalyst is used. The catalyst is typically used together with e.g. conventional coactivator, as well known in the art.

According to one embodiment a Ziegler-Natta catalyst is preferred.

The choice of the Ziegler-Natta catalyst is not critical. Typically said Ziegler-Natta catalyst may contain a magnesium compound, an aluminium compound and a titanium or zirconium compound, optionally supported on a particulate support.

Thus, the catalysts include coordination catalysts of a transition metal compound of group 4 to 10 of the Periodic Table (IUPAC) or a compound of an actinide or lanthanide, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is non-silica supported ZN catalyst, and most preferably $MgCl_2$-based ZN catalyst.

The Ziegler-Natta catalyst further preferably comprises a group 4 (group numbering according to new IUPAC system) metal compound, preferably titanium, more preferably chlorine-containing titanium compound, magnesium dichloride and aluminium.

The catalyst may be commercially available or be produced in accordance or analogously to the literature. For the preparation of the preferable catalyst usable in the invention reference is made to WO2004055068 and WO2004055069, WO2003106510 and EP 0 810 235. The content of these documents in its entirety is incorporated herein by reference, in particular concerning the general and all preferred embodiments of the catalysts described therein as well as the methods for the production of the catalysts. Particularly, preferred Ziegler-Natta catalysts are described in EP 0 810 235.

The multimodal polyethylene copolymer resin composition may be produced by two or more stage polymerisation or by the use of two or more different polymerisation catalysts and/or by the use of different polymerisation conditions in a one stage polymerisation. In principle any polymerisation method including slurry and gas phase polymerisation can be used for producing polymers. The temperature in the polymerisation reactor needs to be sufficiently high to reach an acceptable activity of the catalyst. On the other hand, the temperature should not exceed the softening temperature of the polymer.

Preferably, however, the polymers are produced in a two or three stage polymerisation. Suitable polymerisation processes include liquid phase polymerisation, e.g. slurry polymerization, preferably in the presence of a diluent (or optionally carried out in bulk), or gas phase polymerisation. Preferably the polymerisation involves at least one slurry polymerisation (e.g. in a loop reactor).

Preferably the multimodal polyethylene copolymer resin of the invention is prepared using the same catalyst in each polymerization stage.

The above mentioned low molecular weight (LMW) ethylene polymer fraction or high molecular weight (HMW) ethylene polymer fraction may be polymerized as a slurry polymerization (e.g. in a slurry tank or loop reactor) and the other as a gas phase polymerization (e.g. in a fluidized bed reactor), in any order.

Particularly preferably the multimodal polyethylene copolymer resin composition is formed at least in a two stage process comprising a slurry loop polymerisation followed by a gas phase polymerization. A preferred loop reactor-gas phase reactor system usable in this invention is generally known as BORSTAR® process. The multistage polymerization is preferably carried out using the same Ziegler-Natta catalyst system in each stage.

Moreover, the lower molecular weight (LMW) polymer fraction (a) is preferably polymerized in the slurry reactor, preferably in a loop reactor, and the high molecular weight (HMW) copolymer fraction (b) in the gas phase reactor in the presence of the reaction product of the slurry reactor. As such loop-gas phase reactor systems reference is made to EP 517 868, EP 797 599 and WO2004/111095.

The conditions used in such processes are well known. For slurry reactors, the reaction temperature will generally be in the range 60 to 110° C. (preferably 85-110° C.), the reactor pressure will generally be in the range 5 to 80 bar, and the mean residence time will generally be in the range 0.3 to 5 hours (e.g. 0.5 to 2 hours). The diluent used will generally be an aliphatic hydrocarbon having a boiling point in the range −70 to +100° C. Preferred diluents include hydrocarbons such as propane, isobutane or hexane. Hydrogen is also preferably fed into the reactor to function as a molecular weight regulator.

If gas phase reactions are employed then conditions are preferably as follows:
 the temperature is within the range of 50° C. to 130° C., preferably between 60° C. and 115° C.,
 the pressure is within the range of 10 bar to 60 bar, preferably between 10 bar to 40 bar,
 hydrogen can be added for controlling the molar mass in a manner known per se,
 the mean residence time is typically 0.5 to 8 hours.

The gas used will commonly be a non-reactive gas such as nitrogen or low boiling point hydrocarbons such as propane together with monomer (e.g. ethylene), comonomer (e.g. propene, 1-butene, 1-hexene, etc) and a molecular weight regulator (e.g. hydrogen). If desired, the polymerisation may be carried out in a known manner under supercritical conditions in the slurry, preferably loop reactor, and/or as a condensed mode in the gas phase reactor.

The reaction mixture is preferably removed from the first reactor either continuously or intermittently. Preferably hydrogen, residual monomer and inert low boiling hydrocarbon medium are removed from the reaction mixture. The removal of hydrogen, low boiling hydrocarbon is preferably carried out by flashing means.

After the reaction mixture has been removed from the first reactor and hydrogen, residual reactants and inert low boiling hydrocarbon medium are also removed, the ethylene polymers formed are fed into the second reactor in step ii).

In this second reactor the ethylene polymers formed in step i) are preferably fed into a fluidized bed and a moving bed, wherein the residence time in the fluidized bed and time of a particle for a single pass through the moving bed are independently controlled. This allows for an optimal degree of freedom for the adjustment of required properties of the polymer particles formed.

A single pass time through the moving bed is about 5-360 s, more preferable 10-250 s.

The time for the particle to do a single pass through the moving bed is independently controlled, i.e. plug flow reactor (PFR), of the gas phase reactor residence time.

In the reactor system comprising the fluidized bed reactor and the moving bed reactor, the higher molecular weight (HMW) subfraction (b1) is produced at least partly in the moving bed and thus optionally also in the fluidized bed and the (VHMW) subfraction (b2) is mainly formed in the moving bed reactor.

It is evident for a skilled person that the molecular weight of the polymer during polymerisation is typically controlled and adapted in each reactor by hydrogen concentration, i.e. hydrogen feed, depending on the desired Mw's of the polymer in each fraction (a), (b), (b1) and (b2) of the end multimodal polyethylene copolymer composition. Moreover, the weight ratio of each fraction (a), (b), (b1) and (b2) can be controlled in conventional manner, i.a. by concentration of reactants, i.e. by monomer, comonomer and catalyst feeds, in each reactor zone, as well known.

Moreover, where for example the HMW component (b), (b1) and optional (b2) are made as a second step in a multistage polymerisation, it may not possible to measure their properties, e.g. MFR, directly. However, for example, in the above described polymerisation process of the present invention, the density, $MFR_2$ etc of the HMW component can be calculated using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor is calculated. This calculation can also be used, if desired, when producing/tailoring the multimodal polyethylene copolymer composition.

The integrated combination of the moving bed (PFR) and the fluidized bed reactor results in a narrower split distribution between the very high molecular weight (VHMW) fraction (b2) and the high molecular weight (HMW) fraction (b) compared to two cascaded reactors. Particles which contain a very large weight fraction of very high molecular weight molecules (b2) cannot exist; particles having made a large amount of passes through the moving bed have also made the same amount of passes through the fluidized bed. The residence time distribution for particles in the fluidized bed is behaving like a Continuous Stirred Tank Reactor (CSTR).

Preferably, the fluidized bed and the moving bed are integrated into one reactor.

According to a preferred embodiment the time for a particle for a single pass through the moving bed is independently controlled, preferably by the outflow rate of polymeric materials from the moving bed.

In the moving bed the catalytic polymerization conditions are different compared to those in the fluidized bed. The inlet and outlet of the moving bed reactor are preferably located inside the fluidized bed reactor.

First, because the bed of catalytic particles has a higher density in the moving bed section of the reactor. Furthermore, in order to apply different polymerization conditions, one preferred solution is that gas with a different composition than in the fluidized bed is fed directly into the moving bed. Another, more preferred way of controlling the catalytic polymerization conditions is the use of a separation medium in order to create different polymerization conditions.

For example, a polymerization is carried out at a lower concentration of a chain-growth terminating agent such as hydrogen. Feeding a separating medium to the moving bed results in different reaction conditions in the fluidized bed and in the moving bed.

Preferably the separation medium is added into the moving bed and forms an extraction zone for the undesired gases, the particulate polymeric material is allowed to pass through the separation medium and settles in the form of the moving bed. The separation medium may be a gas or a liquid. The separation medium may be inert to the catalytic polymerization such as nitrogen and C1-C12 alkanes.

The separation medium may be reactive such as monomer, comonomer such as $C_2$-$C_{12}$-alpha-olefin, preferably $C_2$-$C_{12}$-alkene, or mixtures thereof. Mixtures of inert and catalytic polymerization reactive separation medium may be used as desired.

Preferably, use is made of a separation medium which is a liquid that evaporates under the condition during the catalytic polymerization in the moving bed. Accordingly, during evaporation a gas extraction zone of separating medium is formed.

The addition of separation medium and/or separate feed of the reactants to both the fluidized bed and the moving bed may be such that in the fluidized bed and/or in the moving bed a condensed mode polymerization occurs. It is further preferred that the separation medium comprises a polymerization monomer or comonomer or mixture thereof.

Before the first polymerization in the first reactor takes place, a pre-polymerisation is preferably carried out.

A third aspect of the present invention relates to a multimodal polyethylene copolymer resin composition obtainable by the above mentioned process.

In a preferred embodiment of the invention the polymerization process is an in situ polymerization process, comprising preferably a gas phase polymerization in a fluidized bed and in a moving bed. For such process reference is made to e.g. WO2004/111095.

More preferably, the combination of a gas phase polymerization in said fluidized and moving bed is effectuated in two reaction zones arranged in one reactor system. Said combination of a gas phase polymerization in a fluidized and a moving bed, results in multimodal polyethylene copolymer resin composition wherein the particles show an improved homogeneity with respect to weight average molecular weight distribution.

Another aspect of the present invention relates to the use of a multimodal polyethylene copolymer resin composition as described above for the production of a polymeric product.

A further aspect of the present invention relates to a reactor system for providing multimodal polyethylene copolymer resin composition, which system comprises a slurry polymerization reactor, for example a loop reactor, and a gas-phase polymerization reactor, for example a loop gas-phase reactor, wherein the gas-phase polymerization reactor comprises an integrated combination of a moving bed and a fluidized bed reactor.

Another aspect of the present invention comprises the use of this reactor system for providing the multimodal polyethylene copolymer resin composition.

Another aspect of the invention relates to the integrated combination of a moving bed polymerization reactor, and a fluidized bed polymerization reactor.

Mentioned and other features and advantages of the process and the reactor system according to the invention are further explained by way of the following examples given for illustrative purposes and without the intention to limit the invention thereto.

EXAMPLES

I. Definitions and Measurement Methods

The below determination methods were used in the general property definitions given in the above description part and also in examples as stated below.

Melt Flow Rate (MFR):
$MFR_2$, $MFR_5$ and $MFR_{21}$ measured according to ISO 1133 at 190° C. at loads of 2.16, 5.0, and 21.6 kg respectively.

Molecular Weights:
Weight average molecular weight (Mw), number average molecular weight (Mn) and molecular weight distribution (PDI=Mw/Mn) were determined by size exclusion chromatography (SEC) based on standard test methods ISO 16014-2:2003 and ISO 16014-4:2003.

The molecular weight averages and molecular weight distribution were measured on a Waters Alliance GPCV2000 SEC instrument with on-line viscometer at 140 degrees Celsius using 1,2,4-trichlorobenzene (TCB) stabilized with 2,6-di-tert-butyl-4-methylphenol (BHT) as an eluent. A set of two mixed beds and one $10^7$ Å TSK-Gel columns from TosoHaas (=Tosoh Bioscience) was used and the system was calibrated with NMWD polystyrene standards (from Polymer laboratories). The comparable Mw, Mn and MWD results were obtained when Mw determination was effected using Waters 150CV Plus as the SEC instrument and 3X PL Mixed B columns. Both instruments and columns are commercially available.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend, $w_i$ is the weight fraction of component "i" in the blend and $Mw_i$ is the weight average molecular weight of the component "i".

The number average molecular weight can be calculated using the mixing rule:

$$\frac{1}{Mn_b} = \sum_i \frac{w_i}{Mn_i}$$

where $Mn_b$ is the weight average molecular weight of the blend, $w_i$ is the weight fraction of component "i" in the blend and $Mn_i$ is the weight average molecular weight of the component "i".

SEC FTIR:
Method 1:
The comonomer concentration as function of the molecular weight is measured by SEC FTIR.

The separated polymer fractions from the size exclusion chromatography (SEC) are transferred to a LC transformer. The LC transformer sprays the fractionated polymer solution on a rotating Germanium disc at a temperature of 140° C. and a pressure below 10 TORR. The disc with the fractionated polymer, by molecular mass, is analyzed by FTIR. The relative amount of methyl-end groups are obtained as function of the molecular mass

| | |
|---|---|
| SEC: | Waters 150CV plus |
| Detector: | Refractive index (RI)- and Visc.-detector |
| Calibration: | Narrow standard PS (A1114_new1114) |
| Columns: | 3X PL Mixed B. |

| | |
|---|---|
| LC-transform: | Series 300 from Lab Connections |
| FTIR: | Perkin-Elmer GX |

Method 1 was used in examples 1 and 2

Method 2:

The molecular weights and the comonomer concentrations were also analysed using SEC and SEC FTIR, whereby molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined using a Waters GPC2000 instrument, equipped with heated flow cell (at 140° C.) connected via a heated transfer line (at 140° C.) was used with 2× Olexis and 1× Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a MCT detector. The MCT detector is cooled with liquid nitrogen. During the chromatographic run a series of FTIR spectra is collected using the Perkin Elmer TimeBase V2.0 software. The spectrometer settings were 16 accumulations, scan range from 3000 cm−1 to 2700 cm−1, resolution 8 cm−1. A background spectrum taken under run conditions is subtracted from each spectrum collected during the chromatographic run. The spectral data as recorded by TimeBase software is imported into Polymer Laboratories Cirrus V3.1 software and the evaluation towards molecular weights and molecular weight distribution was performed with this software. The evaluation towards short chain branching was performed by calculation of the ration of the absorbance observed at 2964 cm−1 (assigned as related to methyl groups (CH3)) and at 2928 cm−1 (assigned as related to methylene groups (CH2)) at each corresponding retention time. 423.5 μL of sample solution were injected per analysis. The column set was calibrated using universal calibration (according to ISO 16014-2:2003) with at least 15 narrow MWD polystyrene (PS) standards in the range of 0.6 kg/mol to 11 600 kg/mol. Mark Houwink constants for PS, PE and PP used are as per ASTM D 6474-99. All samples were prepared by dissolving 4.0-8.0 mg of polymer in 4 mL (at 140° C.) of stabilized TCB (stabilized with 250 mg/L 2,6-Di tert butyl-4-methyl-phenol) and keeping for max. 3 hours at max. 150° C. with continuous gentle shaking prior sampling in into the SEC instrument.

Method 2 was used in example 3.

The results obtained using method 1 and method 2 are comparable, i.e. comparable results are obtained irrespective of which instrument was used for SEC and SEC FTIR analysis for determining the molecular weights or the comonomer concentrations.

Comonomer content (mol %) was determined with Fourier transform infrared spectroscopy (FTIR) after calibration against C13-NMR results. The comonomer content was converted from mol percent (mol %) to weight percent (wt %).

Density:

Density of the materials is measured according to ISO 1183:1987 (E), method D, using compression moulded plaque samples with isopropanol-water as gradient liquid. The cooling rate of the plaques when crystallising the samples was 15 C/min. The Conditioning time was 16 hours.

Polymerization Examples

The catalyst used in polymerization examples was Lynx 200™ catalyst as manufactured and supplied by Engelhard Corporation, Pasadena, USA, now BASF.

The Ziegler-Natta catalyst is weighed and activated with 1 ml of TEA/hexane solution (3 mol/L). The catalyst is mixed in bed of dried NaCl. The catalyst salt mixture is added to a 100 ml reactor. The used reactor is a tubular like gas phase reactor with a distribution plate on the bottom. Gas is passing once through the reactor, so the gas phase reactor is operated without gas circulation. The catalyst salt mixture is dried in the gas phase reactor under a nitrogen flow. The polymerization is started by feeding a monomer mixture. 1-Hexene is fed as vapour via a saturated ethylene flow (0.8 g/g).

Comparative Example

The polymerization is executed at 80° C. and at atmospheric pressure.

The first polymerization step for 1200 s is a homo polymerization of ethylene with a Hydrogen/Ethylene ratio of 3/7 (molar ratio).

The second polymerization step for 600 s is a copolymerization of ethylene with 1-hexene. The 1-hexene/ethylene ratio is 1/50, and the hydrogen/ethylene ratio is 3/7.

Example 1

The polymerization is executed at 80° C. and at atmospheric pressure. The first polymerization step for 336 s is a homo polymerization of ethylene with a Hydrogen/Ethylene ratio of 17/3. The second polymerization step for 24 s is a copolymerization of ethylene with 1-hexene. The 1-hexene/ethylene ratio is 1/5, and the hydrogen/ethylene ratio is 3/7. The third polymerization step is a repetition of the first polymerization step; a 336 s lasting a homo polymerization of ethylene with a Hydrogen/Ethylene ratio of 17/3. The fourth polymerization step is a repetition of the second polymerization step; a 24 s lasting ethylene 1-hexene copolymerization. The 1-hexene/ethylene ratio is 1/50, and the hydrogen/ethylene ratio is 3/7. The fifth polymerization step is repetition of the first polymerization step.

The sixth polymerization step is a repetition of the second polymerization step. The seventh polymerization step is repetition of the first polymerization step. The eight polymerization step is a repetition of the second polymerization step. The ninth polymerization step is repetition of the first polymerization step. The tenth polymerization step is a repetition of the second polymerization step.

In this example the catalyst has 'moved' 5 times through the moving bed.

Example 2

The polymerization is executed at 80° C. and at atmospheric pressure. The first polymerization step for 336 s is a homo polymerization of ethylene with a Hydrogen/Ethylene ratio of 17/3. The second polymerization step is repetition of the first polymerization step. The third polymerization step for 24 s is a copolymerization of ethylene with 1-hexene. The 1-hexene/ethylene ratio is 1/50, and the hydrogen/ethylene ratio is 3/7. The fourth polymerization step is a repetition of the first polymerization step. The fifth polymerization step is repetition of the third polymerization step. The sixth polymerization step is a repetition of the first polymerization step. The seventh polymerization step is repetition of the third polymerization step. The eight polymerization step is a repetition of the first polymerization step. The ninth polymerization step is repetition of the third polymerization step. The tenth polymerization step is a repetition of the third polymerization step.

In this example the catalyst has 'moved' 4 times through the moving bed.

Examples 1 and 2 simulate a gas phase polymerisation integrated with a moving bed polymerisation process for producing the multimodal polyethylene copolymer composition of the invention having the fractions (a) and (b), which comprises higher and very high molecular weight fractions (b1) and (b2). Characteristics and results of the obtained polymers are given below.

TABLE 1

| MW g/mol | Example 1 | | Example 2 | | Comparative Example | |
|---|---|---|---|---|---|---|
| | Relative amount of CH3 groups | Cumulative wt % polymer | Relative amount of CH3 groups | Cumulative wt % polymer | Relative amount of CH3 groups | Cumulative wt % polymer |
| 5000 | 0.028 | 7.0 | 0.022 | 6.9 | 0.058 | 2.3 |
| 6300 | 0.023 | 10.7 | 0.019 | 10.4 | 0.040 | 3.8 |
| 10000 | 0.023 | 17.4 | 0.037 | 17.1 | 0.034 | 7.2 |
| 15800 | 0.021 | 27.8 | 0.018 | 27.5 | 0.027 | 13.4 |
| 31600 | 0.020 | 38.9 | 0.019 | 38.8 | 0.022 | 21.6 |
| 39800 | 0.021 | 44.0 | 0.020 | 44.0 | 0.019 | 26.0 |
| 50100 | 0.021 | 49.1 | 0.021 | 49.2 | 0.017 | 30.8 |
| 63100 | 0.022 | 55.8 | 0.022 | 56.1 | 0.018 | 37.6 |
| 79400 | 0.025 | 60.6 | 0.024 | 61.1 | 0.018 | 42.9 |
| 100000 | 0.026 | 68.1 | 0.025 | 68.7 | 0.018 | 52.1 |
| 158500 | 0.027 | 74.8 | 0.028 | 75.5 | 0.016 | 61.0 |
| 199500 | 0.025 | 80.5 | 0.031 | 81.2 | 0.018 | 69.2 |
| 316200 | 0.031 | 90.9 | 0.029 | 91.5 | 0.022 | 84.8 |
| 1000000 | 0.046 | 96.8 | 0.033 | 97.2 | 0.024 | 94.0 |
| 1259000 | 0.052 | 98.1 | 0.035 | 98.3 | 0.026 | 95.9 |
| 1585000 | 0.062 | 99.1 | 0.049 | 99.0 | <0.01 | 100.0 |

TABLE 2

| | Example 1 | Example 2 | Comparative example |
|---|---|---|---|
| Comonomer concentration (wt %) | 6.5 | 6.6 | 0.6 |
| Mn (g/mol) | 19 400 | 19 900 | 42 700 |
| Mw (g/mol) | 241 600 | 242 600 | 376 500 |
| PDI = Mw/Mn (—) | 12.5 | 12.2 | 8.8 |
| 2 × Mw (g/mol) | 483 200 | 485 200 | 753 000 |
| 3 × Mw (g/mol) | 724 800 | 727 800 | 1129 500 |

From the results provided in table 1, one can draw the conclusion that the polymer resins of Example 1 & 2 contain in the fraction having an Mw below 16 kD about 40% less comonomer compared to the comparative example. In the fraction having a Mw between 16 kD to 40 kD the resins of examples 1 and 2 comprise about the same concentration comonomer as the comparative example. In the fraction between 50 kD and 100 kD the examples 1 and 2 comprise about 30% more comonomer compared to the comparative example. In the fraction between 100 kD and 1000 kD the examples 1 and 2 contain respectively 50% and 60% more comonomer compared to the comparative example. In the fraction above 1.000 kD examples 1 and 2 comprise respectively 130% and 225% more comonomer compared to the comparative example.

Plots of the cumulative wt % vs Log (Mw) were made on the basis of these results and are shown in FIG. 1, the comparative example, FIG. 2, Example 1, and FIG. 3, Example 2.

These plots illustrate the greater proportion of the comonomers at higher Mw's in the multimodal polyethylene copolymer resin compositions of examples 1 and 2 compared to the comparative example.

Example 3

Example 3 simulates a multistage polymerisation made in loop reactor for preparing fraction (a) and a gas phase polymerisation integrated with a moving bed polymerisation process for producing the higher molecular fraction (b) the multimodal polyethylene copolymer composition of the invention, which comprises higher and very high molecular weight fractions (b1) and (b2).

The catalyst is weighed and activated with TEA and then the catalyst and TEA mixture is injected into a 250 ml standard slurry reactor containing iso-butane, hydrogen and ethylene. The first part of the reaction is performed at 95° C. and 40 bar for 30 minutes, and afterwards the reactor is vented.

The polymer is then transferred using fresh iso-butane to a second reactor where a second part of the polymerization is performed in gas phase. The used reactor is tubular like gas phase reactor with a distribution plate on the bottom. Gas is passing once through the reactor, so gas phase reactor is operated without gas circulation. The polymer/iso-butane mixture is dried under a nitrogen flow.

The second part of the polymerization is started by feeding a mixture of monomer, comonomer, hydrogen and nitrogen through the reactor. The polymerization is executed at 75° C. and at a pressure of 20 bar.

The first polymerization step for 480 s is a copolymerization of ethylene with 1-hexene. The 1-hexene ethylene ratio is 1/14 and the hydrogen/ethylene ratio is 1/25.

The second polymerization step for 120 s is a copolymerization of ethylene with 1-hexene. The 1-hexene/ethylene ratio is 1/14 and the hydrogen/ethylene ratio is 0.

The third polymerization step is a repetition of the first polymerization step; a 480 s lasting ethylene 1-hexene copolymerization step. The 1-hexene/ethylene ratio is 1/14 and the hydrogen/ethylene ratio is 1/25.

The fourth polymerization step is a repetition of the second polymerization step; a 120 s lasting ethylene 1-hexene copolymerization step. The 1-hexene/ethylene ratio is 1/14 and the hydrogen/ethylene ratio is 0.

The fifth polymerization step is a repetition of the first polymerization step.

The sixth polymerization step is a repetition of the second polymerization step.

The seventh polymerization step is a repetition of the first polymerization step.

The eight polymerization step is a repetition of the second polymerization step.

The ninth polymerization step is a repetition of the first polymerization step.

The tenth polymerization step is a repetition of the second polymerization step.

The eleventh polymerization step is a repetition of the first polymerization step.

The twelfth polymerization step is a repetition of the second polymerization step.

The thirteenth polymerization step is a repetition of the first polymerization step.

The fourteenth polymerization step is a repetition of the second polymerization step.

The fifteenth polymerization step is a repetition of the first polymerization step.

The sixteenth polymerization step is a repetition of the second polymerization step.

The seventeenth polymerization step is a repetition of the first polymerization step.

The eighteenth polymerization step is a repetition of the second polymerization step.

In this example the catalyst has 'moved' 9 times through the moving bed.

Characteristics and results of the obtained polymers are given below.

TABLE 3

Results for example 3

| Mw (g/mol) | Relative amount of CH3 groups | Cumulative Wt % polymer |
|---|---|---|
| 3100 | 0.116 | 7.7 |
| 5500 | 0.107 | 13.7 |
| 9600 | 0.102 | 21.9 |
| 14100 | 0.103 | 28.4 |
| 30800 | 0.104 | 43.5 |
| 69100 | 0.104 | 60.9 |
| 105000 | 0.105 | 69.8 |
| 160000 | 0.106 | 78.3 |
| 309000 | 0.108 | 88.6 |
| 486000 | 0.114 | 93.5 |
| 614000 | 0.117 | 95.4 |
| 773000 | 0.125 | 96.8 |
| 983000 | 0.133 | 97.9 |
| 1252000 | 0.147 | 98.7 |
| 1604000 | 0.169 | 99.3 |
| 2060000 | 0.20 | 99.6 |

These results of examples 1-3 show that the polymer resin composition of examples 1, 2 and 3 comprise a relatively high amount of comonomer in the high molecular weight fraction (b).

This means that products thereof have increased mechanical properties, such as for example an increased environmental stress cracking.

The invention claimed is:

1. A multimodal polyethylene copolymer resin composition consisting of a lower molecular weight (LMW) ethylene polymer fraction (a) having a weight average molecular weight (Mw) of from 50,000 to 100,000 grams per mole and a higher molecular weight (HMW) ethylene copolymer fraction (b) having a higher Mw than the LMW fraction (a),
wherein the higher molecular weight (HMW) ethylene copolymer fraction (b) comprises a higher molecular weight (HMW) ethylene copolymer subfraction (b1) and a very high molecular weight (VHMW) ethylene copolymer subfraction (b2),
wherein the HMW ethylene copolymer subfraction (b1) consists of ethylene copolymers having a weight average molecular weight between 500,000 and 1,000,000 grams per mole and at least 2 times the weight average molecular weight (Mw) of said multimodal polyethylene copolymer resin composition,
which HMW ethylene copolymer subfraction (b1) amounts from 1-30 wt % of the total amount of the multimodal polyethylene copolymer resin composition and comprises a comonomers content of between 3-25 wt % of the total amount of comonomer content used in said multimodal polyethylene copolymer resin composition;
wherein the very high molecular weight (VHMW) ethylene copolymer subfraction (b2) consists of ethylene copolymers having a weight average molecular weight greater than 1,000,000 grams per mole and at least 3 times of the weight average molecular weight (Mw) of said multimodal polyethylene copolymer resin composition,
which VHMW ethylene copolymer subfraction (b2) amounts of from 0.5-15 wt % of said multimodal polyethylene copolymer resin composition and has a comonomer content of 3-20 wt % of the total amount of comonomer content used in said multimodal polyethylene copolymer resin composition;
wherein 1-hexene is used as the comonomer and the total amount of comonomer used in said polyethylene copolymer resin composition is from 6.5 wt % to 10 wt %.

2. The multimodal polyethylene copolymer resin composition according to claim 1, wherein the higher molecular weight (HMW) ethylene copolymer subfraction (b1) comprises 1-20 wt % of the total amount of the multimodal polyethylene copolymer resin.

3. The multimodal polyethylene copolymer resin composition according to claim 1, wherein the higher molecular weight (HMW) ethylene copolymer subfraction (b1) comprises 5-20 wt % of the total amount of comonomer content used in the multimodal polyethylene copolymer resin composition.

4. The multimodal polyethylene copolymer resin composition according to claim 1, wherein (a) the lower molecular weight (LMW) ethylene polymer fraction comprises ethylene homo- or copolymers.

5. The multimodal polyethylene copolymer resin composition according to claim 1, wherein the MFR$_2$ of the multimodal polyethylene copolymer resin composition is less than 100 gram per 10 minutes.

6. The multimodal polyethylene copolymer resin composition according to claim 1, wherein the polydispersity index (Mw/Mn) of the multimodal polyethylene copolymer resin composition is more than 3.

7. The multimodal polyethylene copolymer resin composition according to claim 1, wherein:
the HMW fraction (b) has a weight average Mw of from 125,000 to 1,000,000.

8. The multimodal polyethylene copolymer resin composition according to claim 1, wherein the HMW fraction (b) has a weight average Mw of from 100,000 to 800,000.

9. A process for the preparation of a multimodal polyethylene copolymer resin composition comprising the steps of:
i) polymerizing ethylene monomers, and optionally one or more comonomers, in the presence of a catalyst to obtain a lower molecular weight (LMW) ethylene polymer fraction (a) having a weight average molecular weight (Mw) of from 50,000 to 100,000 grams per mole; and ii) polymerizing ethylene monomers and one or more comonomers, in the presence of the polymerization product of the first polymerization step and of a catalyst to obtain multimodal polyethylene copolymer resin composition consisting of a lower molecular weight (LMW) ethylene polymer fraction (a) having a weight average molecular weight (Mw) of from 50,000 to 100,000 grams per mole and a higher molecular weight (HMW) ethylene copolymer fraction (b) having a higher Mw than the LMW fraction (a), wherein the higher molecular weight (HMW) ethylene copolymer fraction (b) comprises a higher molecular weight (HMW) ethylene copolymer subfraction (b1) and a very high molecular weight (VHMW) ethylene copolymer subfraction (b2), wherein the HMW ethylene copolymer subfraction (b1) consists of ethylene copolymers having a weight average molecular weight between 500,000 and 1,000,000 grams per mole and at least 2 times the weight average molecular weight (Mw) of said multimodal polyethylene copolymers resin composition, which higher molecular weight (HMW) ethylene copolymer subfraction (b1) amounts from 1-30 wt % of the total amount of the multimodal polyethylene copolymer resin composition and comprises a comonomer content of between 3-25 wt % of the total amount of comonomer used in said multimodal polyethylene copolymer resin composition, wherein the very high molecular weight (VHMW) ethylene copolymer subfraction (b2) consists of ethylene copolymers having a weight average molecular weight greater than 1,000,000 grams per mole and at least 3 times of the weight average molecular weight (Mw) of said multimodal polyethylene copolymer resin composition, which VHMW ethylene copolymer subfraction (b2) amounts of from 0.5-15 wt % of said multimodal polyethylene copolymer resin composition and has a comonomer content of 3-20 wt % of the total amount of comonomer used in said multimodal polyethylene copolymer resin composition;

wherein 1-hexene is used as the comonomer and the total amount of comonomer used in said polyethylene copolymer resin composition is from 6.5 wt % to 10 wt %.

10. The process according to claim 9, wherein the polymerization for obtaining the first fraction is carried out in a slurry or gas phase and preceded by a prepolymerization step.

11. The process according to claim 9, wherein the polymerization for preparing the higher molecular weight (HMW) ethylene copolymer fraction (b) is carried out in a fluidized bed and in a moving bed, wherein the residence time in the fluidized bed and time of a particle for a single pass through the moving bed are independently controlled.

12. The process according to claim 11, wherein the fluidized bed and the moving bed are integrated in one reactor.

13. The process according to claim 12, wherein polymerization is carried out in more than one pass through the fluidized bed in gas phase and through the moving bed.

14. The process according to claim 11, wherein time of a particle for a single pass through the moving bed is controlled by controlling the outflow rate of particles from the moving bed.

15. The process according to claim 11, wherein the moving bed is separated from the fluidized bed by a separation medium.

* * * * *

UNITED STATES PATENT AND TRADEMARK OFFICE
CERTIFICATE OF CORRECTION

PATENT NO.           : 8,889,793 B2
APPLICATION NO.      : 12/667308
DATED                : November 18, 2014
INVENTOR(S)          : Bergstra et al.

Page 1 of 1

It is certified that error appears in the above-identified patent and that said Letters Patent is hereby corrected as shown below:

On the title page item

(75) insert -- Britt Anneli Pakkanen, Vasterskog (FI) --

(75) insert -- Bill Benjamim Rudolph Gustafsson, Stenungsund, (SE) --

(75) insert -- Günter Weickert, Ahaus, (DE) --

Signed and Sealed this
Fourteenth Day of June, 2016

Michelle K. Lee
*Director of the United States Patent and Trademark Office*